(12) United States Patent
Strauch

(10) Patent No.: US 7,265,883 B2
(45) Date of Patent: Sep. 4, 2007

(54) OPTICAL SCANNER WITH MICRO-OPTICS FOR BEAM COMBINATION

(75) Inventor: Frank Strauch, St. Augustin (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/886,209

(22) Filed: Jul. 7, 2004

(65) Prior Publication Data

US 2005/0007640 A1 Jan. 13, 2005

(30) Foreign Application Priority Data

Jul. 8, 2003 (DE) ............................... 103 30 945

(51) Int. Cl.
*G02B 26/08* (2006.01)
(52) U.S. Cl. .................. 359/198; 369/112.01
(58) Field of Classification Search ............... 359/618, 359/639–640, 833–834, 837; 369/112.01, 369/112.23, 112.25, 112.26, 112.28, 120; 250/578.1, 234

See application file for complete search history.

(56) References Cited

U.S. PATENT DOCUMENTS

| 4,987,566 A | 1/1991 | Shikama et al. ............ 369/122 |
| 5,251,198 A | 10/1993 | Strickler ..................... 369/110 |
| 5,438,586 A | 8/1995 | Ishii et al. .................... 372/50 |
| 5,986,996 A | 11/1999 | Kitamura et al. ........... 369/116 |
| 6,359,850 B1* | 3/2002 | Chung et al. .......... 369/112.01 |
| 6,404,723 B1* | 6/2002 | Morishita ............. 369/112.23 |
| 6,580,674 B1* | 6/2003 | Nishiyama et al. .... 369/112.01 |
| 6,873,589 B2* | 3/2005 | Nakao .................... 369/112.03 |
| 2001/0028626 A1* | 10/2001 | Maruyama et al. ......... 369/121 |
| 2002/0003766 A1 | 1/2002 | Kadowaki et al. ..... 369/112.07 |
| 2002/0167885 A1* | 11/2002 | Odajima et al. ....... 369/112.12 |

FOREIGN PATENT DOCUMENTS

| DE | 242115 A1 | 1/1987 |
| EP | 0 223 191 A2 | 11/1986 |

OTHER PUBLICATIONS

German Search Report.

* cited by examiner

Primary Examiner—Euncha P. Cherry
(74) Attorney, Agent, or Firm—Joseph J. Laks; Harvey D. Fried; Patricia Verlangieri

(57) ABSTRACT

An optical scanner having a micro-optical element for combining two light beams is disclosed. The optical scanner has a micro-optical element including two parts, which serves to combine two light beams emitted, by two beam sources on a photodetector. The first part of the micro-optical element influences the first light beam and the second part of the micro-optical element influences the second light beam.

15 Claims, 3 Drawing Sheets

OPTICAL SCANNER WITH MICRO-OPTICS FOR BEAM COMBINATION

FIELD OF THE INVENTION

The present invention relates to an optical scanner having a micro-optical element for combining two light beams and to an apparatus for reading from and/or writing to optical recording media, which has such an optical scanner.

BACKGROUND OF THE INVENTION

Apparatuses for reading from and/or writing to optical recording media which are suitable for different types of optical recording media often require a plurality of beam sources which emit light beams having a different wavelength. One example is apparatuses for reading from and/or writing to DVDs (digital versatile disc), which are usually able to reproduce CDs (compact disc). Whereas a wavelength of 650 nm is used for the DVDs, the CDs are read with a wavelength of 780 nm. The development of optical drives operating with even shorter wavelengths, such as e.g. drives for Blu-Ray Disc, which operate with a wavelength of 405 nm, will also necessitate the use of a plurality of beam sources in the future.

Many apparatuses use discrete laser diodes for generating the different wavelengths. However, many parts have to be used for such apparatuses, which is associated with high costs and a high adjustment outlay. High costs are caused especially by the required beam combination cube for combining the different light beams. An alternative is beam combiners based on optical gratings, as are described for example in WO 01/93254. However, gratings have a high degree of wavelength dependence, which can lead to problems if the wavelength of the laser diodes drifts with increasing temperature. Moreover, the gratings are not easy to produce since there are blazed gratings.

So-called twin laser diodes are increasingly being used instead of discrete laser diodes. In the case of twin laser diodes, two laser diodes, e.g. for DVD and CD are arranged in a common housing, which entails advantages for the parts costs and production. Twin photodetectors having discrete photodetectors for the two light beams are often used in this case. According to present-day prior art, this concept cannot be applied to all types of optical storage media since correspondingly rapid twin photodetectors still do not exist for example for the high speeds occurring in the case of DVD-ROM.

SUMMARY OF THE INVENTION

It is an object of the invention to propose an optical scanner, which is improved, compared with the prior art.

According to the invention, this is achieved by means of an optical scanner having a micro-optical element comprising two parts and serving for combining two light beams emitted by two beam sources on a photodetector, the first part influencing the first light beam and the second part influencing the second light beam. The desired influencing is a deflection of one or both light beams toward a common target point. The distance between the two parts of the micro-optical element decides whether and where the continuing light beams meet. A prerequisite for the use of such a micro-optical element is that the light beams are separate upstream of the element. The use of a single lens is precluded in this case since the two light beams do not otherwise intersect at the focus. In order to obtain a producible element, in an advantageous manner, only those surface parts of the elements, which actually contribute to beam influencing, are taken into account.

In an advantageous manner, the two parts of the micro-optical element are segments of a first and a second converging lens. The basic idea of a micro-optical lens for combining two light beams is that of a lens which arises conceptually from two lenses by pushing them together laterally apart from a specific distance. One part of the lens acts only on one light beam, and the other part on the other light beam. A tip results in the beam-free region between the light beams. It is preserved even when going over to practical lens forms. Of course, the tip may also be quarried, but only as far as is permitted by the separation of the light beams. Overall, the curve form is variable with only a slight effect on the quality of the imaging on the detector. Depending on the embodiment of the micro-optical lens, either the entry area or the exit area of the micro-optical lens is designed as a beam-influencing area. As an alternative, it is also possible for both areas to be embodied in beam-influencing fashion.

The micro-optical element is preferably a double prism. The double prism or roof prism results from a micro-optical lens by using the straight line as the simplest form for the curve form of the lens area. The exit area of the micro-optical element is preferably embodied as the double prism since the separation of the light beams is greater there. In this case, the entry area of the micro-optical element may be designed as a lens surface, which can be used to control the size of the light beam on the detector. The lens surface may be configured for example as a spherical or cylindrical area. The latter makes it possible to produce a perfectly round beam cross section on the photodetector area, which leads to a symmetrical S-curve. This is of importance for the servo electronics. In this case, the cylinder has to be rotated such that the plane of curvature corresponds to the plane in which the prism angle is also located.

In accordance with a further exemplary embodiment, the micro-optical element is a cone. The cone represents a generalization of the idea of the double prism. One practical advantage resides in the simplification of the adjustment relative to the photodetector, since the angle dependence is obviated. However, the cone introduces an additional astigmatism. Its suitability as a micro-optical element must therefore be checked in the individual case. In the case of the cone as well, the exit area of the micro-optical element is preferably formed in a conical manner. The entry area may again be formed as a lens surface.

The micro-optical element is advantageously arranged at the photodetector. The distance between the two light beams is greatest there, as a result of which the requirements made of the minimization of the micro-optics and the adjustment accuracy are reduced. As an alternative, the micro-optical element is arranged at the beam sources. There, too, the light beams are separated relatively far from one another, thus resulting in less stringent requirements made of the minimization of the micro-optics and the adjustment accuracy in this case as well. Depending on the embodiment, the micro-optical element may cause additional astigmatism in the light beams. An arrangement at the photodetector is preferable in such cases.

The micro-optical element is preferably adhesively bonded to the photodetector. The micro-optical element has to be adjusted in the optical scanner. However, the element is very small and arranged near the photodetector, which likewise has to be adjusted, as a result of which the adjustment is made more difficult. However, the micro-optical element may be brought into direct contact with a covering glass of the photodetector. This requires a preadjustment under the microscope, during which the micro-optical element is oriented on the basis of the separating line of the detector areas. The micro-optical element is subsequently fixed on the covering glass by means of a process step, for example adhesive bonding. The adjustment of the photodetector remains as a normal process step in the production of optical scanners. The preadjustment of the micro-optical element has less stringent accuracy requirements than the adjustment of the photodetector since there is a tolerance range with respect to displacement and rotation of the micro-optical element.

According to the invention, the micro-optical element is an integral part of the covering glass of the photodetector. This is possible, for example, by producing the micro-optical element and the covering glass as a unit by means of the plastic injection-molding method. The covering glass, normally embodied in plane fashion, is then structured. This constitutes a very elegant solution since the process of preadjustment is shifted to the mold for the detector housing.

The beam sources are advantageously integrated to form a twin laser diode. This entails advantages for the parts costs and production. On the one hand, adjustment of the relative positions of the laser diodes is obviated and, on the other hand, it is possible to dispense with a cost-intensive beam combination cube. Moreover, most of the optical components of the optical scanner can be used for both light beams, so that fewer components are required overall.

According to the invention, the micro-optical element influences the spatial position of only one of the light beams. The micro-optical element can be configured more simply in this way. Preferably, only the light beam that is less critical with respect to aberrations is deflected. Moreover, the different optical path length of the two light beams can also be utilized for compensating for an optical offset that is possibly present.

For better adjustability of the light beams on the detector, it is advantageous if provision is made of an optical adjustment element, which can be used to influence the spatial position of the first and/or the second light beam. Such an optical adjustment element is for example an essentially plane-parallel plate. As is known, a plane-parallel plate placed obliquely into a light beam generates a beam offset. The latter is dependent on the thickness d of the plate, the angle α of rotation of the plate and the refractive index n. If such a plane-parallel plate, situated only in the beam path of one of the light beams upstream of the detector, is rotated about an axis perpendicular to the light beam, that is to say the angle α is changed, then the position of the light beam on the detector changes. If such a plane-parallel plate is introduced into both beam paths, the positions of both light beams can be changed correspondingly. Moreover, the wavelength dependence of the refractive index of the plane-parallel plate can be utilized in order to adapt the distance between the two light beams. For this purpose, a common plate is used for both light beams. Since the refractive index is a function of the wavelength, a rotation of the plate leads to an offset between the two light beams, which has a varying magnitude. The distance between the laser spots on the detector thus becomes adjustable. In the course of adjustment, it is necessary in this case to track the detector. The optical adjustment element is particularly advantageous for a so-called single detector, in which one detector is used for both light beams. However, it may equally be used in the case of a so-called twin detector, in which two detectors are combined to form a unit, for adjusting the light beams.

As an alternative, the micro-optical element itself may also serve as the adjustment element. An effect analogous to the plane-parallel plate is achieved by rotating the roof prism, for example, about an axis parallel to the roof edge.

An apparatus for reading from and/or writing to optical recording media preferably has an optical scanner according to the invention. Such an apparatus is able to use light beams having different wavelengths for reading from and/or writing to different types of optical recording media in a cost-effective manner.

BRIEF DESCRIPTION OF THE DRAWINGS

In order to provide a better understanding, the invention will be explained below on the basis of exemplary embodiments with reference to the figures. It goes without saying that the invention is not restricted to the exemplary embodiments. Advantageous combinations of the various features of the invention likewise lie within the scope of validity of the invention.

DETAILED DESCRIPTION OF PREFERRED EMBODIMENTS

Figure 1:
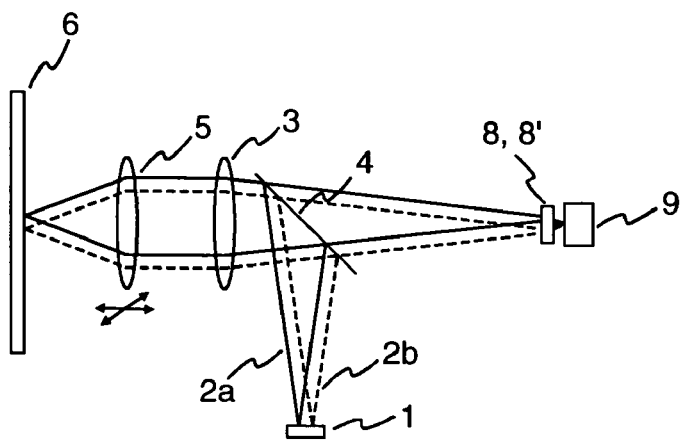
FIG. 1 diagrammatically shows an optical scanner having a micro-optical element for beam combination.

An optical scanner having a micro-optical element 8 for beam combination is illustrated diagrammatically in FIG. 1. A twin laser diode 1 emits a first light beam 2a and a second light beam 2b. The light beams 2a, 2b are deflected via a half-mirror 4 in the direction of an optical recording medium 6 and collimated with the aid of a collimator lens 3. By means of a movable objective lens 5, the light beams 2a, 2b are focused onto a data track situated on the optical recording medium 6. The objective lens 5 can be moved by an actuator (not shown) in the direction of the optical recording medium 6 and also perpendicularly to the data track in order to keep the focus of the light beams 2a, 2b exactly on the track. The reflected light beams 2a, 2b, which are modulated in accordance with the data stored in the track, are collimated by the objective lens 5 and focused onto a photodetector 9 by the collimator lens 3, passing through the half-mirror 4 in the process. The photodetector 9 has a plurality of light-sensitive elements separated by separating lines. The signals of said elements are used to determine, on the one hand, the stored data and, on the other hand, a focus error signal and a track error signal for controlling the actuator. A micro-optical element 8, 8' is situated upstream of the photodetector 9 and ensures that the two light beams 2a, 2b have the same position on the photodetector 9.

Figure 2:
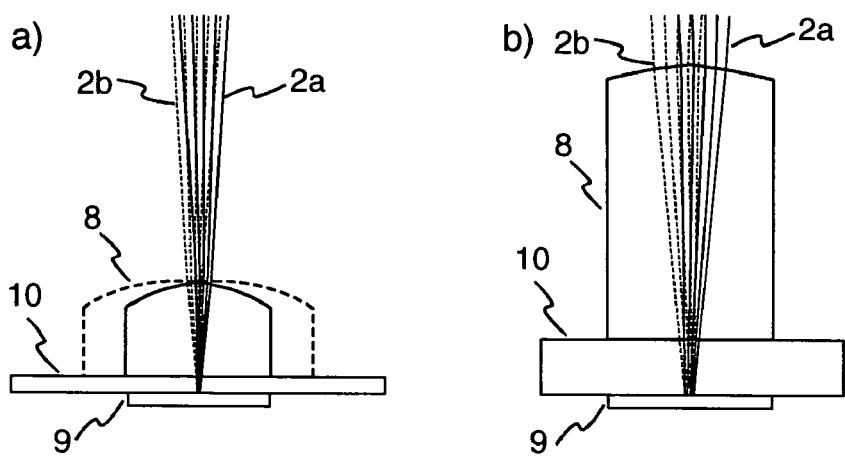
FIG. 2 shows a first exemplary embodiment of a micro-optical element according to the invention.

FIG. 2a) shows a first exemplary embodiment of a micro-optical element 8 according to the invention. FIG. 2b) shows an enlargement for illustrating the course of the light beams 2a, 2b. The illustration shows the basic idea of a micro-optical lens 8 in cross section. One area is that of a normal lens and the other area corresponds to the combination of two lenses. The cross-sectional area shown corresponds to the plane in which the source points of the light beams 2a, 2b are also located. The two light beams 2a, 2b are concentrated in this plane. For given distance conditions in the optical scanner, it is possible to define the position of the focus by means of the focal length of the micro-optical lens 8. Independent of this is the centering of the two light beams 2a, 2b on the common photodetector area 9, which is achieved only by displacing the lens parts. In the illustrations shown, the influencing of the light beams 2a, 2b by the covering glass 10 of the photodetector 9 is also taken into account.

Figure 3:
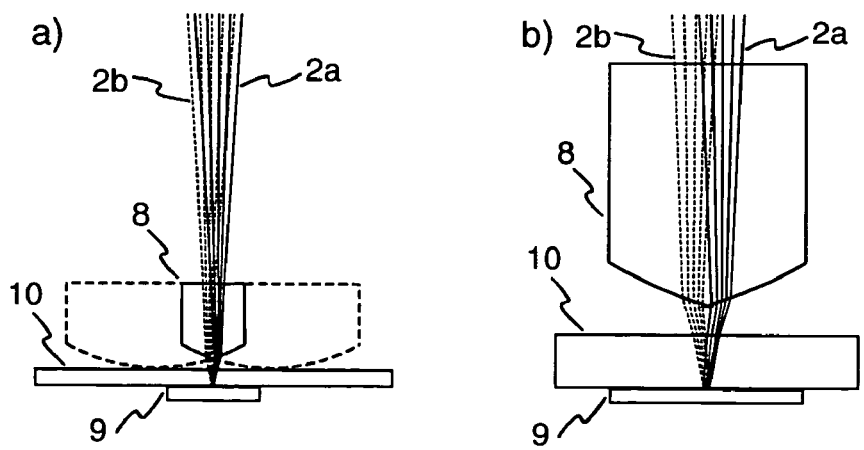
FIG. 3 shows a second exemplary embodiment of a micro-optical element according to the invention.

FIG. 3a) illustrates an alternative arrangement of the micro-optical element 8. FIG. 3b) again shows an enlargement for illustrating the course of the light beams 2a, 2b. In the exemplary embodiment illustrated, the roles of entry area and exit area have been interchanged in comparison with the exemplary embodiment illustrated in FIG. 2. Since the remaining path length to the photodetector 9 is shorter here, the two lens parts have to be separated further from one another.

The nearer the micro-optical element 8 is to the covering glass 10, the further the splitting of the light beams 2a, 2b. A certain minimum splitting of the light beams 2a, 2b must be ensured since, even in the event of a deflection of the objective lens 5 transversely with respect to the tracks of the optical recording medium 6, no light beam 2a, 2b is permitted to leave the lens area allocated to it. This arrangement is additionally advantageous since, in the event of a deflection of the objective lens 5 in the focus direction, the form of the light beams 2a, 2b is critically altered by the astigmatism caused essentially by the half-mirror 4 in the course of passing through it. In the illustration, the micro-optical lens 8 does not bear on the covering glass 10 of the photodetector 9. It goes without saying that the micro-optical lens 8 can also be displaced in the direction of the photodetector 9 to an extent such that its tip is located on the covering glass 10. Lateral supports are advantageous for the purpose of fixing on the covering glass 10. The micro-optical lens 8 and the supports can be injection-molded for example in a single step.

Figure 4:
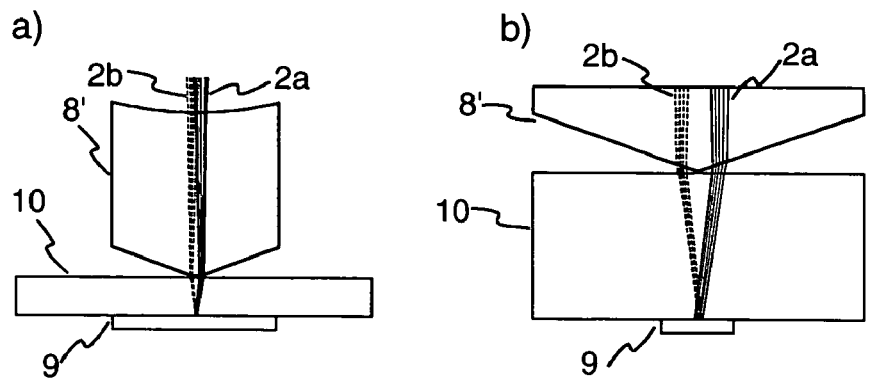
FIG. 4 shows a third exemplary embodiment of a micro-optical element according to the invention.

A third exemplary embodiment of a micro-optical element 8' according to the invention is illustrated in the form of a double or roof prism in FIG. 4a) and b). Since the roof edge bears on the covering glass 10 of the photodetector 9, lateral supports are advantageous here, too. In the figure, the entry area of the micro-optical element 8' is designed as a lens surface which is used to influence the size of the light beams 2a, 2b on the photodetector 9. The lens surface may be for example a spherical or a cylindrical area. In the case of a cylindrical area, the cylinder has to be arranged such that the plane of curvature corresponds to the sectional plane in which the prism angle is also situated. For the purpose of preadjustment, the roof edge is oriented along the separating line between the detector halves of the photodetector 9. The microscope reveals two images of the separating line, which are located symmetrically about the roof edge. The use of a four-quadrant photodetector provides freedom to orient the roof edge at one of the two separating lines arranged in cross-shaped fashion. That separating line which lies parallel to the track deflection of the actuator is chosen for practical reasons. This ensures that the light beams 2a, 2b on the photodetector 9 are not cut off by the roof edge in the event of a track following movement. This also at the same time defines the orientation angle of the twin laser diode 1 as source of the light beams 2a, 2b. If an installation-dictated incorrect angle arises, the light beams 2a, 2b on the photodetector 9 are spatially split. However, during the adjustment of the photodetector 9, a rotation of the twin laser diode 1 can be compensated for with a rotation of the photodetector 9.

Figure 5:
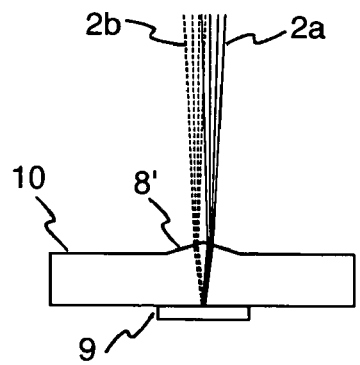
FIG. 5 shows a micro-optical element according to the invention, which is integrated into the covering glass of a photodetector.

The different wavelengths used, for example for DVD and CD, have no influence on the design of the double prism 8'. Even in the case of a symmetrical embodiment of the double prism 8', the roof edge can be placed centrally onto the separating line of the photodetector 9. A wavelength-dependent splitting of the light beams 2a, 2b on the photodetector 9 cannot be ascertained. The different refractive power of the double prism 8 for the two wavelengths used is negligible in the case of the short distances. This simplifies both the construction and the adjustment of the double prism 8'. If an adjustment-dictated parallel offset between the separating line and the roof edge arises, it does not affect the superposition of the light beams 2a, 2b on the photodetector 9. This fact makes it possible to merge double prism 8' and photodetector 9, as is shown in FIG. 5. In the exemplary embodiment illustrated, the double prism 8' is already contained in the covering glass 10 of the photodetector 9.

A focus offset that may be present also has only little influence on the superposition of the light beams 2a, 2b on the photodetector 9. A focus offset is a typical misadjustment of an optical scanner, which may arise inter alia as a result of thermal loading or ageing. It is understood to be an incorrect position of one or else a plurality of optical components 3, 4, 5 in the direction of the light beam 2a, 2b, so that a focus in the information layer of the optical recording medium 6 no longer automatically results in a focus on the photodetector 9. In apparatuses for reading from and/or writing to optical recording media 6, the focus offset is generally compensated for by the servo-electronics. Even in the case of limit-value focus offsets, the superposition of the light beams 2a, 2b on the photodetector 9 is not impaired. However, the beam superposition exhibits a relatively sensitive behavior with respect to the distance between double prism 8' and photodetector 9. If the double prism 8' is simply placed onto the covering glass 10, the distance is readily reproducible and invariant with respect to ambient influences.

Figure 6:
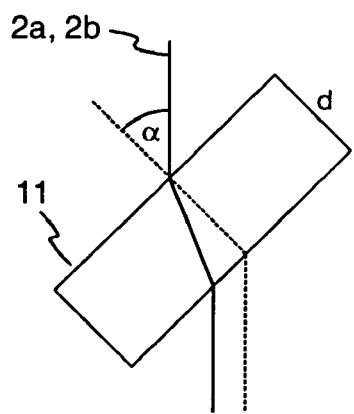
FIG. 6 shows an optical adjustment element for adjusting the spatial position of a light beam, and FIG. 7 diagrammatically shows the functioning of the optical adjustment element.

FIG. 6 illustrates an optical adjustment element 11 for adjusting the spatial position of a light beam 2a, 2b. As is known, a plane-parallel plate 11 placed obliquely into a light beam generates a beam offset x. The latter is dependent on the thickness d of the plate, the angle α of rotation of the plate and the refractive index n according to the following formula:

$$x = d \cdot \frac{\sin\alpha \cdot \cos\alpha}{\sqrt{n^2 - \sin^2\alpha}} \tag{1}$$

In this case, the beam offset is expressed with respect to the optical axis of the emerging beam 2a, 2b. The two light beams 2a, 2b of the twin laser diode 1 now traverse the plane-parallel plate 11. The difference Δx in their respective beam offset is:

$$\Delta x = d \cdot \sin\alpha \cdot \cos\alpha \cdot \left( \frac{1}{\sqrt{n_1^2 - \sin^2\alpha}} - \frac{1}{\sqrt{n_2^2 - \sin^2\alpha}} \right) \tag{2}$$

In this case, $n_1$ and $n_2$ denote the refractive indices of the plate 11 at the two wavelengths of the twin laser diode 1. Since the refractive indices are close together, the following can be approximated:

$$\Delta x = \frac{d}{2} \cdot \sin\alpha \cdot \cos\alpha \cdot (n_1 - n_2) \cdot (n_1 + n_2) \cdot (n_2^2 - \sin^2\alpha)^{-3/2} + \text{offset} \quad (3)$$

The offset corresponds to the separation of the two optical axes downstream of the plate 11. For an angle of rotation $\alpha=0$, all that remains is the offset. It should correspond to the distance between the detector areas for DVD and CD, for example. If not, it is possible to effect correction with $\Delta x$ by setting an angle $\alpha$ of rotation at which the detector areas are impinged on correctly. In this case, the correction is proportional to $(n_1-n_2)$, i.e. all the more effective, the more dispersive the material.

Figure 7:
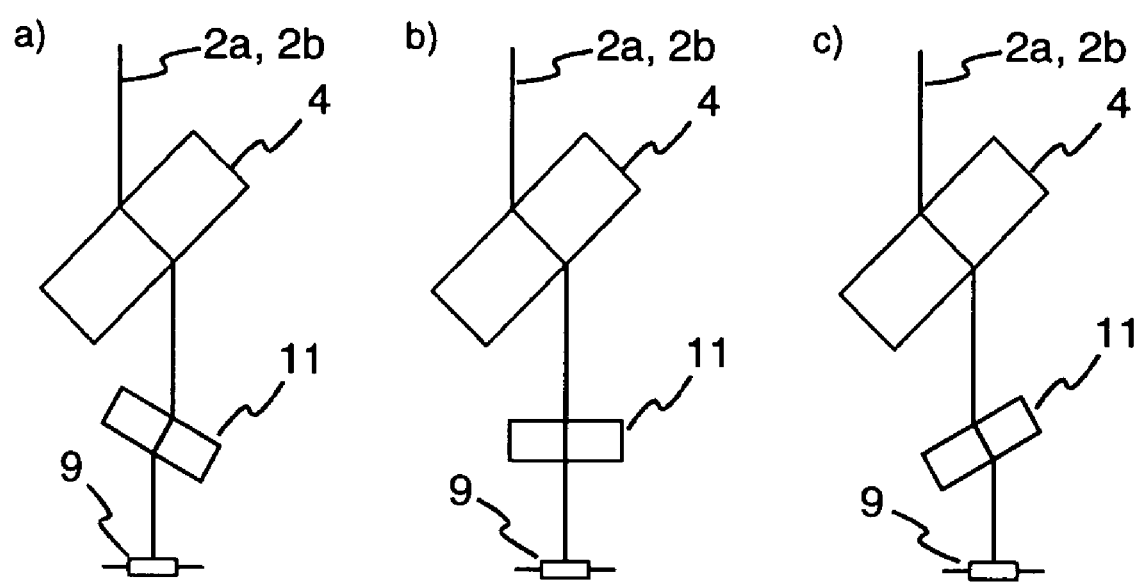

The exemplary embodiment shown in FIG. 7 will be explained below. The illustration shows the optical path of a scanner, in which the adjustment element is installed downstream of a half-mirror 4, in various adjustment states a), b) and c) produced by rotating the plate 11 about an axis. The plate 11 may be produced from plastic material, so that it can be injection-molded together with its rotary housing. There are materials where $(n_1-n_2)=0.01$, the absolute index values always being 1.5. The linear range of the correction extends up to about 40° according to formula 3. Moreover, the correction becomes flatter. In the linear range, a spot correction of at most 3 μm results given a plate thickness of 1 mm. It is already worthwhile employing this correction in order to increase the performance of the scanner. The rotary range of the plate 11 should thus be designed to be very large. The plate 11 is advantageously an essentially plane-parallel plate. However, it may perfectly well be curved, too, thereby increasing the sensitivity. In the course of the adjustment, it is necessary to track the detector 9, which becomes clearly apparent from FIG. 7. The setting of the optical adjustment element 11 and the centering of the detector 9 are thus to be carried out progressively.

If it is necessary to greatly alter the angle $\alpha$ for using a laser diode from another manufacturer, then the spot size and the length of the S-curve can be increased on account of the astigmatism of the plate 11. At an angle $\alpha=0$, these values are given only by an astigmatism of the half-mirror 4. The behavior of the S-curve is identical for positive or negative sense of rotation. Impairment of the servo electronics by a slightly lengthened S-curve is not expected. If only batch-dependent variations of the laser diode 1 are compensated for with relatively small angle changes, then these effects are not present.

What is claimed is:

1. An optical scanner, comprising:
a one-piece micro-optical element for combining first and second light beams at the same position on a photodetector, said first and second light beams being emitted by two beam sources arranged side-by-side in a common housing, the one-piece micro-optical element having two parts, the first part influencing the first light beam and the second part influencing the second light beam, wherein the one-piece micro-optical element is arranged at the photodetector.

2. The optical scanner of claim 1 wherein the two parts of the one-piece micro-optical element are segments of a first and a second converging lens.

3. The optical scanner of claim 1 wherein the one-piece micro-optical element is a roof prism.

4. The optical scanner of claim 1 wherein the one-piece micro-optical element is a cone.

5. An apparatus for reading from and/or writing to optical recording media comprising:
an optical scanner as claimed in claim 1.

6. The optical scanner of claim 1 wherein the one-piece micro-optical element forms a unit with the photodetector.

7. The optical scanner of claim 1 wherein the one-piece micro-optical element is an integral part of a covering glass of the photodetector.

8. The optical scanner of claim 1 wherein the one-piece micro-optical element Is arranged at the beam sources.

9. The optical scanner of claim 8 wherein the beam sources are integrated to form a twin laser diode.

10. The optical scanner of claim 1 wherein the one-piece micro-optical element influences the spatial position of only one of the light beams.

11. The optical scanner of claim 1 further comprising an optical adjustment element for adjusting the spatial position of at least one of the first and second light beam.

12. The optical scanner of claim 11 wherein the optical adjustment element is an essentially plane-parallel plate.

13. The optical scanner of claim 11 wherein the optical adjustment element is the micro-optical element.

14. An optical scanner having a one-piece micro-optical element for combining two light beams at the same position on a photodetector, said light beams being emitted by two beam sources arranged side by side in a common housing, the micro-optical element having two pads, the first pad influencing a first light beam and the second part influencing a second light beam, wherein the two parts of the micro-optical element are segments of a first and a second converging lens.

15. An optical scanner having a one-piece micro-optical element for combining two light beams at the same position on a photodetector, said light beams being emitted by two beam sources arranged side by side in a common housing, the micro-optical element having two parts, the first part influencing the first light beam and the second part influencing the second light beam, wherein the micro-optical element is a roof prism or a cone.

* * * * *